United States Patent [19]

Tamura

[11] Patent Number: 4,633,926
[45] Date of Patent: Jan. 6, 1987

[54] HEAVY DUTY PNEUMATIC RADIAL TIRE
[75] Inventor: Akira Tamura, Iruma, Japan
[73] Assignee: Bridgestone Corporation, Tokyo, Japan
[21] Appl. No.: 687,310
[22] Filed: Dec. 28, 1984
[30] Foreign Application Priority Data
   Dec. 29, 1983 [JP]   Japan ................... 58-251170
[51] Int. Cl.⁴ ............... B60C 11/00; B60C 9/28
[52] U.S. Cl. ................... 152/209 R; 152/538
[58] Field of Search ........... 152/209 R, 209 D, 209 B, 152/361 R, 361 FP, 526, 528, 530, 532, 538

[56]          References Cited
       U.S. PATENT DOCUMENTS
   3,916,968 11/1975 Masson ............... 152/361 R
   4,445,561  5/1984 Kono et al. ........... 152/209 B
   4,456,046  6/1984 Miller ................ 152/209 R Primary Examiner—Michael Ball
Attorney, Agent, or Firm—Sughrue, Mion, Zinn, Macpeak and Seas

[57]           ABSTRACT

Disclosed herein is a heavy duty pneumatic radial tire in which a tread portion of the tire is reinforced by superimposing a belt composed of plural rubberized cord layers upon the outer periphery of a radial structure carcass composed of one or more rubberized cord layers containing cords each arranged in a radial plane of the tire or in a plane deviating at a small angle therefrom; the belt has a substantially lower flexural rigidity at central region than at side regions; and the tread portion has such a tread pattern that has a substantially higher negative ratio at central region than at side regions.

5 Claims, 3 Drawing Figures

<u>PRIOR ART</u>

HEAVY DUTY PNEUMATIC RADIAL TIRE

BACKGROUND OF THE INVENTION (1) Field of the Invention

The present invention relates to a heavy duty pneumatic radial tire, and more particularly, the invention relates to a heavy duty pneumatic radial tire, for instance, a tire for use in the construction vehicles. Such tires are advantageously adapted for use in running on rough roads at a considerably high speed, wherein durability of belt is improved by effectively avoiding belt separation which is caused by shear strain at edges of the belt without deteriorating wear resistance and uneven wear resistance of such a tire.

(2) Description of the Prior Art

In such a radial tire, the tread portion of the tire is generally reinforced by superimposing a belt composed of plural rubberized cord layers upon the outer periphery of a radial structure carcass composed of one or more rubberized cord layers containing cords each arranged in a radial plane of the tire or in a plane deviating at a small angle therefrom.

In general, the belt is broadly classified into the following two kinds in terms of the structure:

(i) The cords are arranged at an angle of as small as about 20°-25° with respect to a plane containing the central circumference of the tire, that is, the equatorial plane of the tire, so as to restrain the enlargement of the outer diameter caused when the tire contacts the ground during running.

(ii) The cords of the nearest belt layer to the carcass and positioned on the innermost side are arranged at an angle of about 65°-70° with respect to the equatorial plane, and the cords of the remaining belt layers are arranged at an extremely small angle with respect to the equatorial plane, so that triangle link structure is formed between the carcass cords and the belt cords to give a high rigidity to the crown portion of the tire.

As to the item (i), since the shear strain between the cord layers at the edge portion of the belt becomes excessive, which is caused by the tread portion contacting the ground, separation problems at that position are likely to develop, while as to item (ii), although the occurrence of the shear strain when the internal pressure is applied is low due to its high rigidity in a direction along the tire equator, the belt is forcedly deformed while running on a rough road of an uneven surface on which rocks and/or stones are scattered by the deformation of the tread portion when it contacts the ground. Hence, the portions near the edges of the belt fixed in the triangle link structure exceed the permissible shear strain, wherein a separation problem is likely to occur.

Although there have been various examinations directed to a reduction in the strain at the belt edges through making proper the belt width, cord angle and cord number per unit length, and changing the quality of the cords for the belt and the carcass line to avoid the belt edge separation (hereinafter referred to briefly as "end separation") in the heavy duty pneumatic radial tire for use in the running road containing the above rough road as at least a part thereof, there is naturally a limit on the improvement by such a method, since the necessary rigidity of the belt and the strain of the belt edges are just in the reverse relation with each other, so that when the rigidity of the belt is lowered to decrease the strain, a demerit inevitably takes place with respect to the wear resistance and the uneven wear resistance of the tread.

Meanwhile, as to the tread patterns, the so-called lug type pattern is commonly used because the conventional tire of this type generally needs strong traction, but there has not been reported in the literature any studies in which attention was directed to examine the tread pattern as the governing factor of the strain behavior at the tread portion, particularly, the belt edge portions.

SUMMARY OF THE PRESENT INVENTION

It is an object of the present invention to provide a heavy duty pneumatic radial tire in which the belt and the tread are functionally divided into a central region and the right and left side regions sandwiching the central region with respect to the equatorial plane of the tire, and the flexural rigidity is appropriately imparted upon the respective regions, whereby the end separation can effectively be restrained together with the attainment of the wear resistance, and the uneven wear resistance.

According to the present invention, the heavy duty pneumatic radial tire is reinforced by superimposing a belt composed of plural rubberized cord layers upon the outer periphery of a radial structure carcass composed of one or more rubberized cord layers containing cords each arranged in a radial plane of the tire or in a plane deviating at a small angle therefrom; the belt has a substantially lower flexural rigidity at central region than at side regions; and the tread portion has such a tread pattern that has a substantially higher negative ratio at central region than at side regions.

These and other objects, features and advantages of the invention will well be appreciated upon reading of the following description of the invention when taken in conjunction with the accompanying drawings with understanding that some modifications, variations and changes would be easily done by the skilled in the art to which the invention pertains without departing from the spirit of the invention and the scope of claims appended hereto.

DETAILED DESCRIPTION OF THE INVENTION

The tire construction according to the present invention relates to the combination of the belt structure and the tread pattern in the heavy duty pneumatic radial tire, and it can be said that the above object is attained by appropriately setting the ratio in the flexural rigidity between the central region and the both side regions of the belt 1 and the tread portion 3. As the substitute measure of the flexural rigidity is appropriately adopted the total thickness of the laminated belt as to the belt, and the negative ratio as to the tread pattern.

In order to appropriately distribute the flexural rigidity onto the belt, the thickness of the laminated belt may be adjusted in such a way that the rubber gauge between the belt layers is made thicker at both side or the belt is designed as a folded belt structure, or to the contrary, the belt is designed in a central portion-lacking belt structure.

Figure 1:
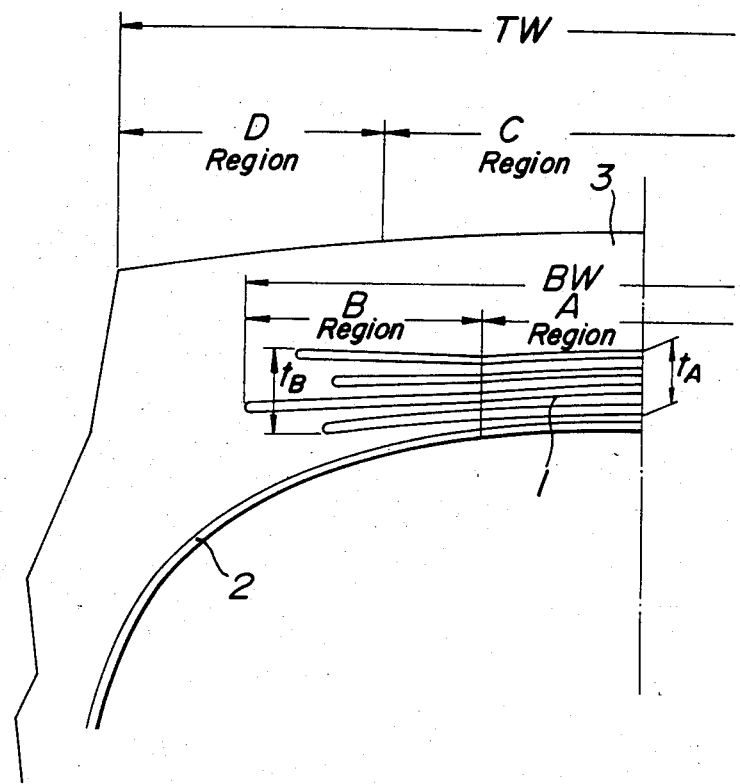
FIG. 1 is a sectional view of a tire.

The central region of the belt is symmetrical on the right and left sides with respect to the equatorial plane of the tire and is defined as an A-region in FIG. 1 which corresponds to 40% of the largest belt width BW, and the remaining B-regions are taken as the side regions. Taking the largest thicknesses of the A-region and the B-regions as $t_A$ and $t_B$ respectively, the ratio of the $t_B/t_A$ is preferably set in a range of 1.25–1.55, more preferably 1.30–1.45.

On the other hand, as to the tread pattern, the central region of the tread is defined as a C-region in FIG. 1 which is symmetrical on the right and left sides sandwiching the equatorial plane of the tire and corresponds to 50% of the tread width $T_W$, and the remaining D-region is taken as the both side regions. The ratio of the negative ratio $N_C$ at the C-region to the negative ratio $N_D$ at the D-region is preferably set at 1.15 to 1.50, more preferably 1.25–1.45. The negative ratio used herein means an area ratio of the grooves to the landing portion in the tread ground-contacting surface when the normal internal pressure and the normal load is applied to the tire.

Figure 2:
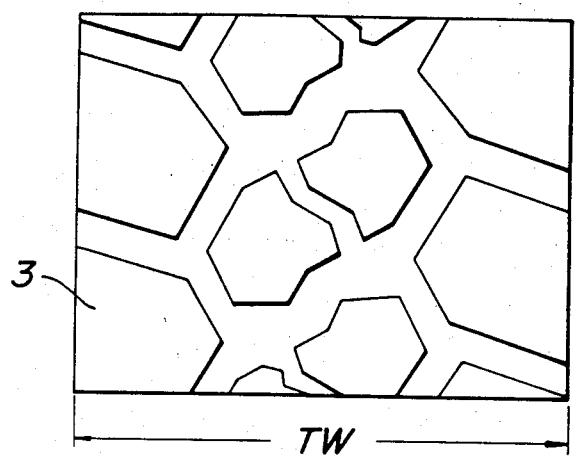
FIG. 2 is a developed view of a tread pattern according to an embodiment of the present invention.
Figure 3:
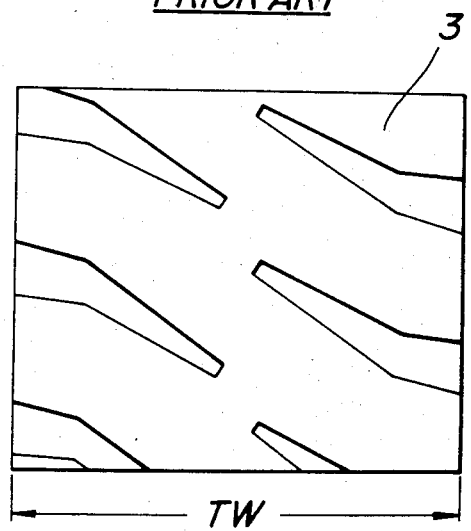
FIG. 3 is a developed view of a conventional lug pattern.

The ratio $N_C/N_D$ of 1.15–1.50 can advantageously be attained by employing the tread pattern of the center block/shoulder lug (transversely long block) type as shown in FIG. 2, and other tread patterns different from that shown in FIG. 2 may be employed. For reference purposes, the conventional common lug type tread pattern is shown in FIG. 3.

The thicknesses $t_A$ and $t_B$ of the laminated belt are measured as including a high elasticity rubber of the elasticity modulus of 0.35–0.55 kg/mm$^2$ which is used as a covering rubber or squeegee rubber of the cord layers of the belt. If the ratio of $t_B/t_A$ is less than 1.25, any special superiority can not be obtained as compared with the conventional belt, and it is not suitable for the object of the invention. On the contrary, if the ratio exceeds 1.55, the increase in the heat generation at the B-region begins to have an adverse affect, and the separation is liable to occur around the cords due to the excessive movement at the A-region which becomes relatively too thin.

Needless to explain, the belt 3 composed of cord layers of steel cords of an elasticity modulus of 5,000–20,000 kg/mm$^2$ at a number of cords per unit length of around 13 cords/25 mm according to the conventional manner may be used in combination with the carcass 2 composed of one layer of steel cords or Kevlar cords or the carcass 2 composed of at least two layers of the polyester cords.

As to the tread pattern, if the ratio of $N_C/N_D$ is less than 1.15, end separation is not actually prevented, while if it exceeds 1.50, movement of the rubber at the central region is too large, so that it is disadvantageous in terms of the wear life, which is also adversely affected by a relatively small amount of rubber, and there is a danger of vigorous cut damage particularly on the rough roads.

The invention will be explained more in detail with reference to the following specific Examples together with Comparative Example, but Examples are merely illustrative of the invention and never interpreted to limit the scope thereof.

Test tires A, B and C of a tire size of OR 18.00 R 25 were prepared according to FIGS. 1 and 2 together with a conventional similar tire D having the lug type tread pattern as shown in FIG. 3. They were subjected to a durability test while being actually mounted on a car. After 50,000 Km running, the occurrence state of the end separation (length of the cracks) and the produced state of the wear are compared in the following Table.

|  |  | Tire kind | | | |
| --- | --- | --- | --- | --- | --- |
|  |  | A | B | C | D |
| Belt | $t_A$ (mm) | 12 | 12.5 | 13 | 13 |
|  | $t_B$ (mm) | 17 | 16 | 15 | 13 |
|  | $t_B/t_A$ | 1.42 | 1.28 | 1.15 | 1.00 |
| Tread pattern | $N_C$ | 0.40 | 0.43 | 0.43 | 0.32 |
|  | $N_D$ | 0.28 | 0.34 | 0.34 | 0.41 |
|  | $N_C/N_D$ | 1.43 | 1.26 | 1.26 | 0.78 |
| End separation (Crack length) (Index) |  | 10 | 45 | 70 | 100 |
| Uneven wear |  | Not observed | Not observed | Observed | Slightly observed |

In the above tests, the belt composed of steel cords of a cord elasticity modulus of 13,000 kg/mm$^2$ at a number of cords per unit length of 13 cords/25 mm was applied to each of the tires.

According to the test results, end separation could be avoided without being accompanied by the wear resistance deterioration with respect to the tires A and B in which both the flexural strength of both the belt and the tread portion were simultaneously taken into account, whereas there remained a defect in end separation and local wear resistance in the case of the tire C in which no due attention has been paid on the belt and in the case of the tire D in which both the belt and the tread didn't meet the requirements.

As mentioned above, according to the present invention, the end separation resistance, the wear resistance and the uneven wear resistance can all be attained.

What is claimed is:

1. A heavy duty radial tire comprising; a tread portion, a radial structure carcass composed of one or more rubberized cord layers containing cords each arranged in a radial plane of the tire or in a plane deviating at a small angle therefrom, a belt composed of plural rubberized cord layers upon the outer periphery of the radial carcass and having a substantially lower flexural rigidity at central region than at side regions; wherein the ratio $t_B/t_A$ in which $t_A$ is the maximum thickness of the belt in the central region thereof and $t_B$ is the maximum thickness in the side region thereof is 1.25–1.55 and the tread portion has such a tread pattern that a ratio $N_C/N_D$ in the negative ratio between the central region and the side regions is 1.15–1.50.

2. The heavy duty pneumatic radial tire according to claim 1, wherein the ratio of the $t_B/t_A$ is 1.30–1.45.

3. The heavy duty pneumatic radial tire according to claim 1, wherein the ratio of $N_C/N_D$ is 1.25–1.45.

4. The heavy duty pneumatic radial tire according to claim 1, wherein said tread pattern is a transverse long block lug pattern.

5. The heavy duty pneumatic radial tire according to claim 1, wherein the thicknesses $t_A$ and $t_B$ respectively comprise a laminated belt thickness including a covering rubber of the belt cord layers, said covering rubber having an elasticity modulus of 0.35–0.55 kg/mm$^2$.

* * * * *